United States Patent [19]

Kobayashi

[11] 4,212,348
[45] Jul. 15, 1980

[54] HEAT-RADIATING FLOOR BOARD

[76] Inventor: Toshiyuki Kobayashi, 401,24-5, Showa-cho, Suita-shi, Osaka, Japan

[21] Appl. No.: 895,484

[22] Filed: Apr. 11, 1978

[30] Foreign Application Priority Data

Apr. 4, 1977 [JP] Japan .................................. 52-48712
Nov. 2, 1977 [JP] Japan ................................ 52-131869

[51] Int. Cl.² ............................................. F24H 9/08
[52] U.S. Cl. ...................................... 165/49; 165/171; 237/69; 165/136
[58] Field of Search ...................... 165/171, 53, 56, 49, 165/136; 237/69; 62/451

[56] References Cited

U.S. PATENT DOCUMENTS 1,800,150  4/1931  Musgrave et al. ...................... 165/56
3,251,198  5/1966  Cornelius ............................... 165/171

FOREIGN PATENT DOCUMENTS 2211254  9/1973  Fed. Rep. of Germany ........... 165/136
2509841  9/1974  Fed. Rep. of Germany ............. 237/69
2535522  2/1977  Fed. Rep. of Germany ............. 165/49
2553967  6/1977  Fed. Rep. of Germany ............. 165/53
1362789  4/1964  France ....................................... 165/49
52-25442  2/1977  Japan .
52-41443  3/1977  Japan .

Primary Examiner—Albert W. Davis
Assistant Examiner—Margaret A. Focarino
Attorney, Agent, or Firm—Browdy and Neimark

[57] ABSTRACT

A kind of radiating floor board is disclosed which radiates heat. The floor board has a stratified structure comprising a metallic surface plate, a depressed metallic tube for hot water circulation located meanderingly under the plate, a heat insulating material and a base board.

5 Claims, 3 Drawing Figures

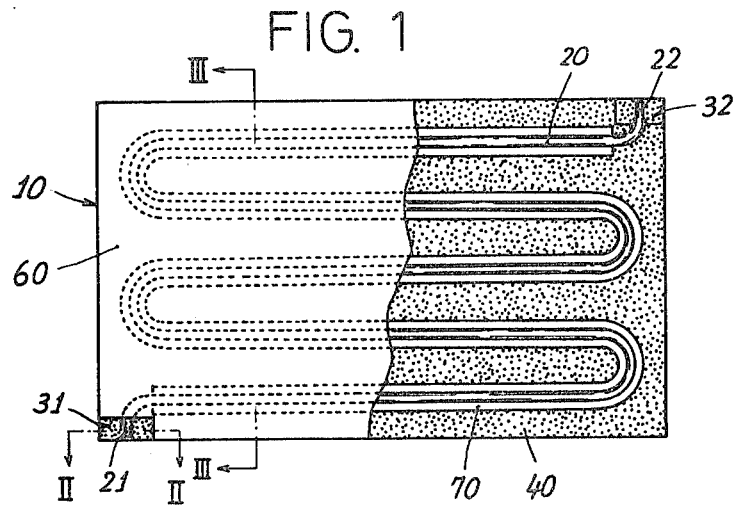
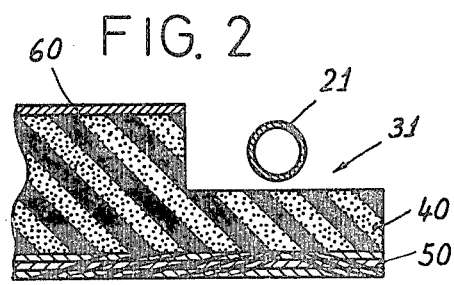
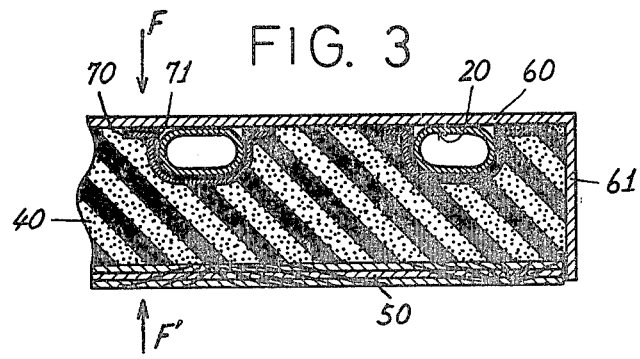

HEAT-RADIATING FLOOR BOARD

The present invention relates to a kind of radiating floor board for heating a room under circulation of hot water.

A certain kind of heat-radiating floor board is already known which has a stratified structure consisting of a surface metallic plate, a mortar layer of rectangular cross section having a metallic ordinary tube laid inside, a heat insulating layer of plastic rigid foam and a wooden base board. The said known floor board has some problems to be solved. The metallic radiating plate is separated from the hot water circulation metallic tube, in other words, a certain remarkable amount of mortar is interposed between the plate and the tube.

The said interposition of mortar brings about a lower heat efficiency and a retarded response, namely a slower start of a sufficient heating. The larger amount of mortar must be heated before the heat radiation from the surface plate. Furthermore, the mortar layer makes the floor board heavier and thicker.

The most important object of the present invention is to create a heat-radiating floor board of higher heat efficiency which can rapidly be pre-heated to a sufficient temperature level.

The other object is to provide a heat-radiating floor board which can be more easily installed both in existing houses or other buildings and in those under planning.

The further object is to realize a heat-radiating floor board of higher durability.

The present invention offers a new type of heat-radiating floor board of a stratified composition comprising a metallic surface plate, a metallic tube of a depressed cross section sticked with aluminum thin tapes to the inner surface of the plate, a base wooden board and a rigid plastic foam intermediate layer between the said base board and the said surface plate, or between the said base board and the said thin tapes. The said depressed metallic tube are bent in some places and distributed meanderingly and evenly over the whole area of the floor board. The above-mentioned metallic tube contacts directly and closely with the surface plate on the one bow-shaped arc and adheres with the thin tape on the other bow-shaped arc. Accordingly, the metallic tube is laid under the surface plate and covered indirectly with the rigid plastic foam.

Hereinabove, the foam has substantially an even specific gravity all over the board. The foam would be preferably molded after arrangement of other elements of the board. In this preferred case, the base wooden board and the surface plate (or the thin tape, locationally) are strongly bonded without any adhesive reagent.

The above-mentioned wooden base board is desirably a veneer board of a proper thickness which can reinforce the floor board.

The following features are also important in the oblong or square floor board in the present invention. The four side surfaces of the board are covered with the metallic plate bent rectangularly downwards at the four edge portions. The inlet and outlet portions of the metallic tube have an ordinary circular shape in cross section.

The heat-radiating floor board in accordance with the present invention can economically warm rooms of houses or other buildings. The heat energy of the circulated hot water in the depressed tube will be effectively conducted to the surface plate in closer and wider contact with the tube. The said surface plate will be rapidly heated to the standard temperature level. The heat capacity of hot water preparation equipment will be reduced, and the amount of fuel or other energy source consumed in the equipment can also be decreased.

The thin and light heat-radiating boards are easily installed on any type of floor and can be easily bound one another by connecting the tubes at their circular tip ends and then puttying the narrow openings between the metallic side walls. The said metallic side walls have also a reinforcing effect at the edge portions of the board.

The structure of the heat-radiating floor board and its advantages will be more fully understood from the following detailed description and the attached drawings illustrating a practical embodiment.

IN THE DRAWINGS

FIG. 1 is a floor plan of an embodiment in accordance with the invention;

FIG. 2 is the enlarged 11—11 cross-sectional view of FIG. 1;

FIG. 3 is the enlaraged 111—111 cross-sectional view of FIG. 1.

Referring to FIG. 1, a copper depressed tube 20 is meanderingly located substantially over the whole of the heat-radiatng floor board 10. Both numeral 31 and 32 indicate cut ends at the corners of the floor board 10.

At the cut ends 31, 32, the both free ends 21 and 22 of the depressed tube 20 have circular cylindrical shapes in cross sectional view as shown in FIG. 2. The ends 21, 22 are not in contact with the adjacent rigid polyurethane foam 40.

As shown in FIG. 3, the foam 40 is interposed between the bottom wooden board 50 and the top metallic members consisting of the copper depressed tube 20, the surface aluminum plate 60 in closely contact with the said tube 20 and the aluminum adhesive tape 70. The said tape 70 is sticked with its adhesive reagent 71 to the lower half surface of the tube 20 and to the adjacent lower surface of the plate 60.

The said wooden board 50 is of three-ply veneer board, and is strongly sticked to the said polyurethane foam 40 without any additive adhesives being applied. The top metallic members 60, 70 are also sticked to the foam 40 without any adhesives.

The edge portions 61 of the surface aluminum plate 60 are bent downwards to cover the side surface of the foam 40.

In the preferred embodiment described above, the rigid polyurethane foam 40 is formed after the other members are arranged in order in a mold. Namely, the raw liquid material of the foam is poured into the hollow among the members, polymerized to form innumerable small voids and then cooled for hardening.

The above-mentioned aluminum tape 70 of restricted width prevent the liquid material from infiltrating into the extremely narrow crevices between the tube 20 and the plate 60.

EXAMPLE

In an example of the heat-radiating floor board having width of 850 mm, length of 1700 mm and total thickness of 26 mmt, the members are of dimensions as follows:

the thickness of the aluminum plate; 0.6 mmt, the specific gravity of the polyurethane foam; 0.1 g/cm$^3$, the elliptic copper tube; minor axis 10 mm × major axis 20 mm × thickness 0.71 mmt, the aluminum tape; width 50 mm × thickness 0.05 mmt, the thickness of the three-ply veneer board; 5.5 mmt.

The thermal conductivity of the exemplified board is proved to be higher than 1000 kcal/mhr°C. The withstanding pressure under compression in the arrowed directions F,F' is higher than 8 kg/cm$^2$.

A desirable embodiment is explained above with an example, however, the detailed practical structure and materials of the heat-radiating floor board are not to be restricted to it. It would be understood that any other modified heat-radiating floor board could be expected within the scope of the present invention. For instance, the surface plate could be of aluminum, iron or any other metal which has high thermal conductivity, high mechanical strength and durability. The material for the depressed tube could also be copper, aluminum, stainless steel or any other thermal conductive and uncorrodible metal.

What is claimed:

1. A heat-radiating floor board which has a stratified structure, the board comprising a metallic surface plate having a lower surface; a metallic tube of noncircular cross section and having a substantial flat surface, fixed meanderinly with its said flat surface in contact with said lower surface of said plate with heat-reflecting aluminum adhesive tape, said tape being in contact with a portion of said tube and with portions of said plate adjacent to said tube; an intermediate layer of hard plastic foam strongly adhering to said metallic tube, said tape and said lower surface; and a wooden base board strongly adhering to said intermediate layer.

2. A heat-radiating floor board according to claim 1, wherein edge portions of said metallic surface plate are bent downwardly to cover side surfaces of said intermediate layer, and wherein both tip ends of said metallic tube are of circular, cylindrical shape and extend outwardly from said intermediate layer in cut-out portions of the floor board.

3. A heat-radiating floor board according to claim 1, wherein said intermediate layer is of hard polyurethane foam formed after arrangement of other members inside a mold, said metallic surface plate is of aluminum, said metallic tube is of copper and said wooden base board is of veneer board.

4. A heat-radiating floor board according to claim 2, wherein said intermediate layer is of hard polyurethane foam formed after arrangement of other members inside a mold, said metallic surface plate is of aluminum, said metallic tube is of copper and said wooden base board is of veneer board.

5. A heat-radiating floor board according to claim 1, wherein said metallic tube has two substantially flat surfaces, said tube having a cross section substantially in shape of a partially flattened O.

* * * * *